Figure 1:
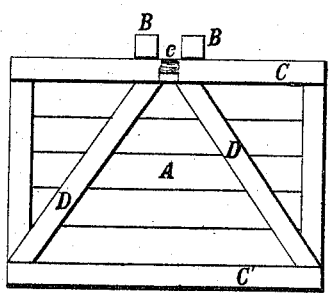
Figure 2:
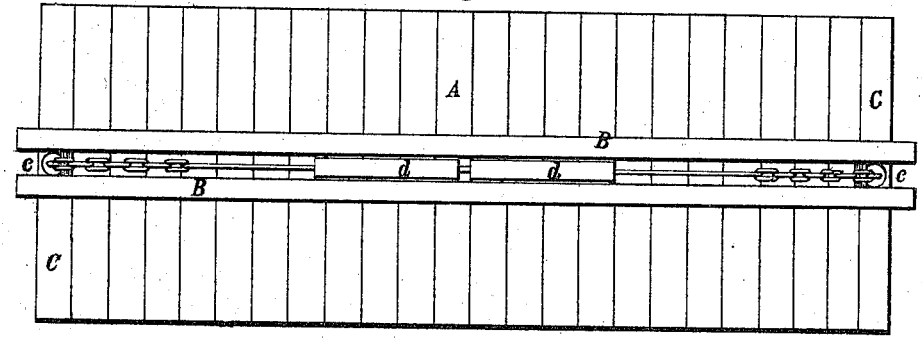
Figure 3:
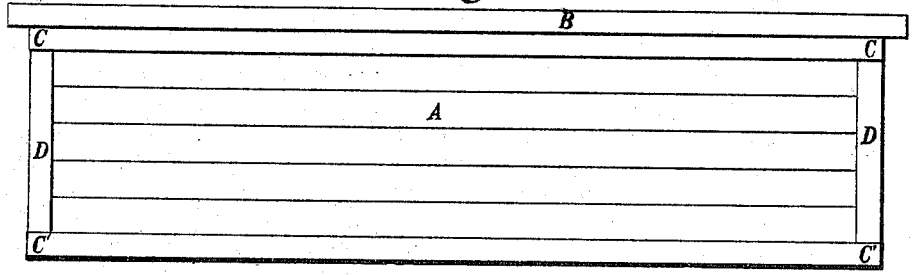

3 Sheets--Sheet 1.

J. RICE.
Pontoons for Raising Sunken Vessels.

No. 142,275.

Patented August 26, 1873.

Witnesses.

D. P. Dobbins
James Sengler

Inventor,

John Rice
by Langster & Beeker
Att'ys.

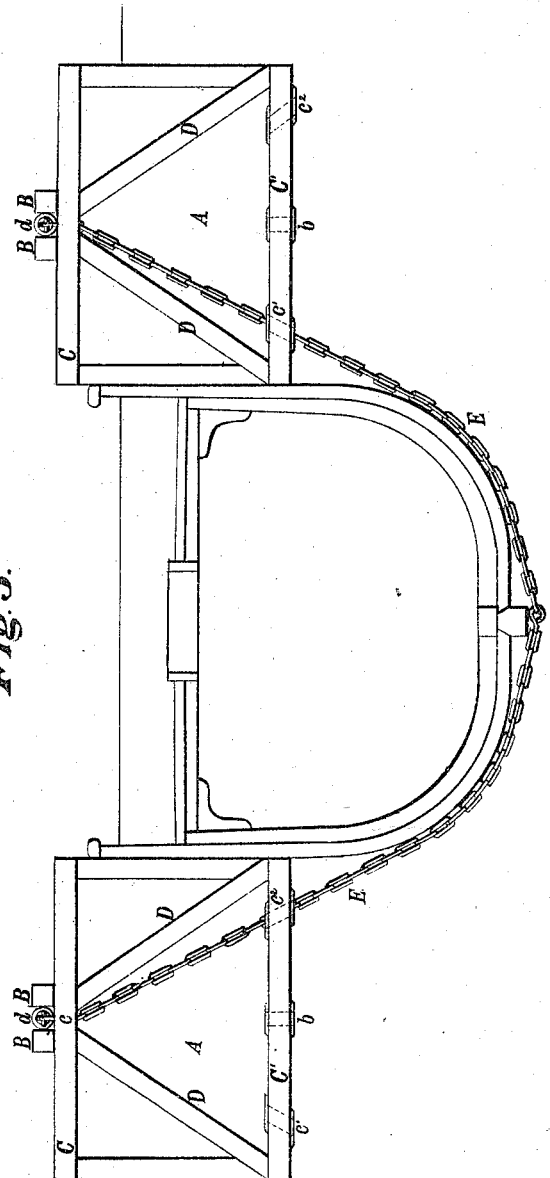

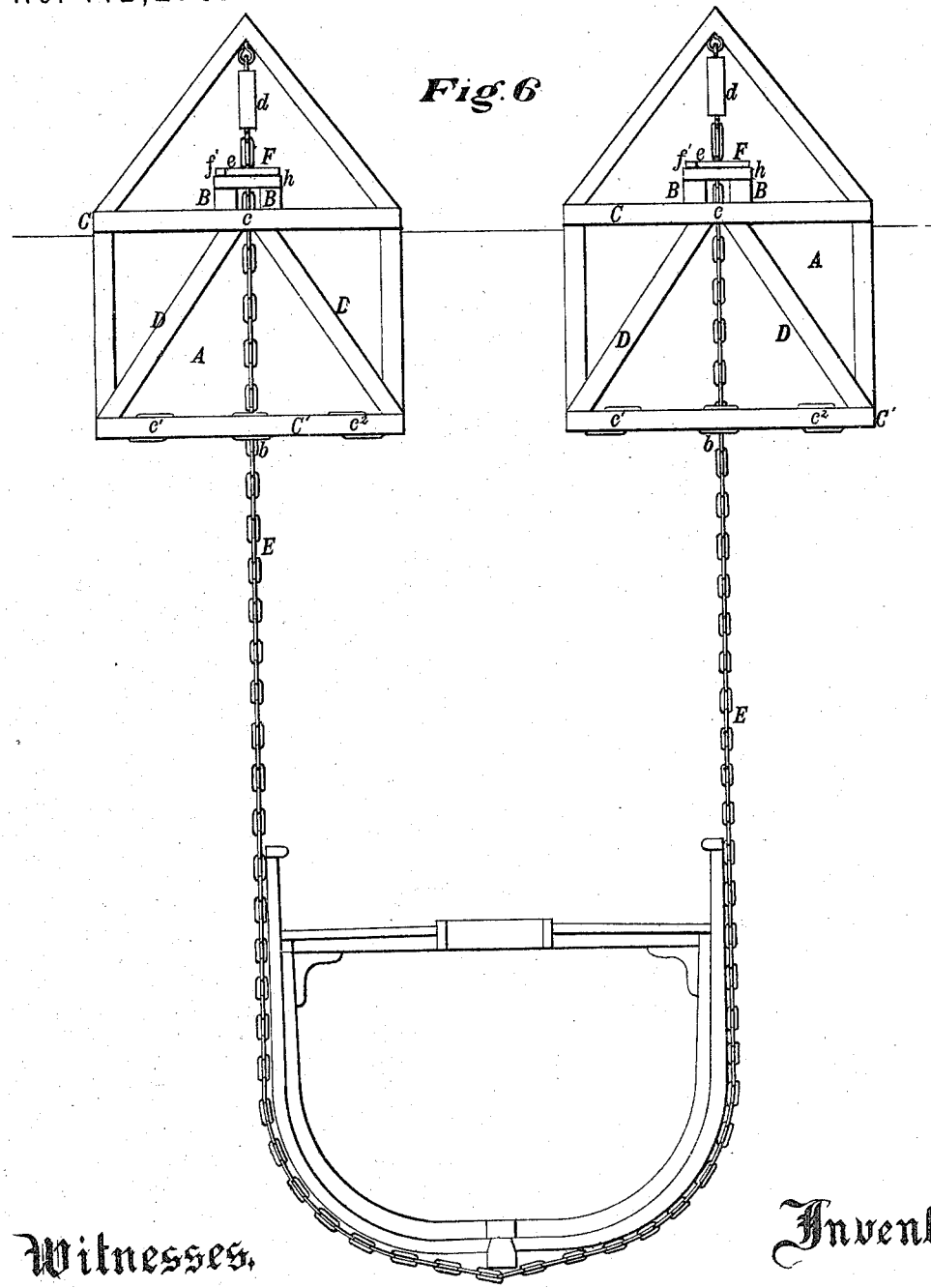

UNITED STATES PATENT OFFICE.

JOHN RICE, OF BUFFALO, NEW YORK.

IMPROVEMENT IN PONTONS FOR RAISING SUNKEN VESSELS.

Specification forming part of Letters Patent No. 142,275, dated August 26, 1873; application filed August 7, 1872.

*To all whom it may concern:*

Be it known that I, JOHN RICE, of Buffalo, in the county of Erie and State of New York, have invented certain new and useful Improvements in the Construction of Pontons for Raising Sunken Vessels and Lightering Loaded ones over Bars and Shoal Waters, of which the following is a specification:

My invention relates to the construction of pontons, with reference, more particularly, to the manner of reeving the chains which are attached to or pass under the object to be raised; and it consists in constructing a ponton with lateral horizontal end timbers, through which the chains passing under the wreck are reeved.

In the accompanying drawings, Figure I is an end view of the ponton. Fig. II is a plan view thereof. Fig. III is a side elevation. Fig. V is a view showing the mode of attaching the improved ponton to a vessel near the surface of the water. Fig. VI is a view showing the mode of attaching the pontons when the wreck lies in deep water.

Like letters of reference designate like parts in each of the figures.

A is the ponton, which is provided with hatches through its deck, and valves for letting in water through its bottom. B B are timbers running fore and aft on the deck, and overlapping it on the ends. C are lateral timbers forming an extension to the deck, and provided with holes $c$, into which iron chocks are inserted to prevent the wear which would naturally result from contact of chains with the timber. C' are timbers extending from the bottom of the ponton, corresponding to the timbers C above. $c^1$ are chocked holes in the timbers C', near their starboard ends. They are cut at an angle to the top of the timbers, so that a line drawn through them would reach the holes $c$. $c^2$ are similar holes in the port ends of the timbers C', and $b$ is a hole corresponding to and in line with the hole $c$ above. D D are timbers forming A-braces between the deck and bottom extending timbers, and taking the strain when the pontons are in use. E are the chains which are made fast to or passed under the object to be raised or lightered, as shown in Fig. V, a tension being obtained on these chains by means of hydraulic pulling-jacks $d$, which may be placed between the timbers B, so as to pull fore and aft on the chains; or A-braces may be arranged over the ends of the pontons, as shown in Fig. VI, their apex being above the hole $c$. To these, above, the jacks are made fast, thus having a vertical pull on the chains. F is a toggle for holding the chains from being drawn through the holes.

The operation of my improved ponton is as follows: A vessel being sunk in shallow water, with her rails above or near the surface, the pontons are placed alongside—one of a pair on each side. One end of their chains is then made fast to the hydraulic jack, while the other is reeved through the holes $c$ and $c^1$, and passed under the keel of the wreck, then up through the holes $c^2$ and $c$ in the other ponton, and then attached to the hydraulic jack on its deck. After the chains connecting each pair of pontons have been thus passed under the keel, or otherwise made fast to the wreck, the valves are opened and the pontons allowed to fill with water, until their decks are down to the water's edge. The valves are then closed, the slack of the chains taken in, and the toggles F placed on them so as to rest on the toggle-blocks $h$. The pontons are now pumped out, and by their gradually-increasing buoyancy raising the wreck, when it may be towed where wanted.

When a vessel is sunk in deep water, the chains are reeved through the holes $c$ and $b$, as shown in Fig. VI, and made fast to the vessel in the most convenient manner, the chains passing vertically through the holes, and, being held in the hole $b$ in the bottom timbers, prevent the ponton from canting over in the water, which is the great disadvantage in the use of pontons constructed on the old principle, viz., passing the chains through wells flaring out toward the lower corners. The greatest advantage, however, derived from the use of my invention is, the chains being reeved through the holes $c^1$ and $c^2$ in the lateral end timbers C', and the pontons being alongside of and supporting a vessel, the direction of the strain on the chains is such as will hold the pontons against the sides of the vessel, and no sudden pressure under the inner, or lack of water under the outer, lower corner of the ponton, caused by the oscillations or variations at and near the surface of the water during a storm, can cast the pontons upon edge, as is the case when flaring wells are employed, and the pontons are not held stationary laterally by the chains; for this reason wreckers are invariably compelled to detach the pontons from a recovered wreck when overtaken by even a moderate storm, which often results in her irrecoverable loss.

The object of my invention is to construct pontons wherein the chains are reeved so as to hold them upright in the water when lifting, instead of allowing them to cant over with a large portion out of water, and a consequent loss of buoyancy.

I claim—

The combination of the longitudinal deck-timbers B B with the lateral end timbers C C', having the iron-chocked holes $c$, $c^1$, $c^2$, and $b$, and the A-braces D D, all being constructed and arranged so that the chains may be reeved at the ends of the pontons, substantially as and for the purposes shown.

JOHN RICE.

Witnesses:
VICTOR H. BECKER,
JAMES SANGSTER.